Figure 1:
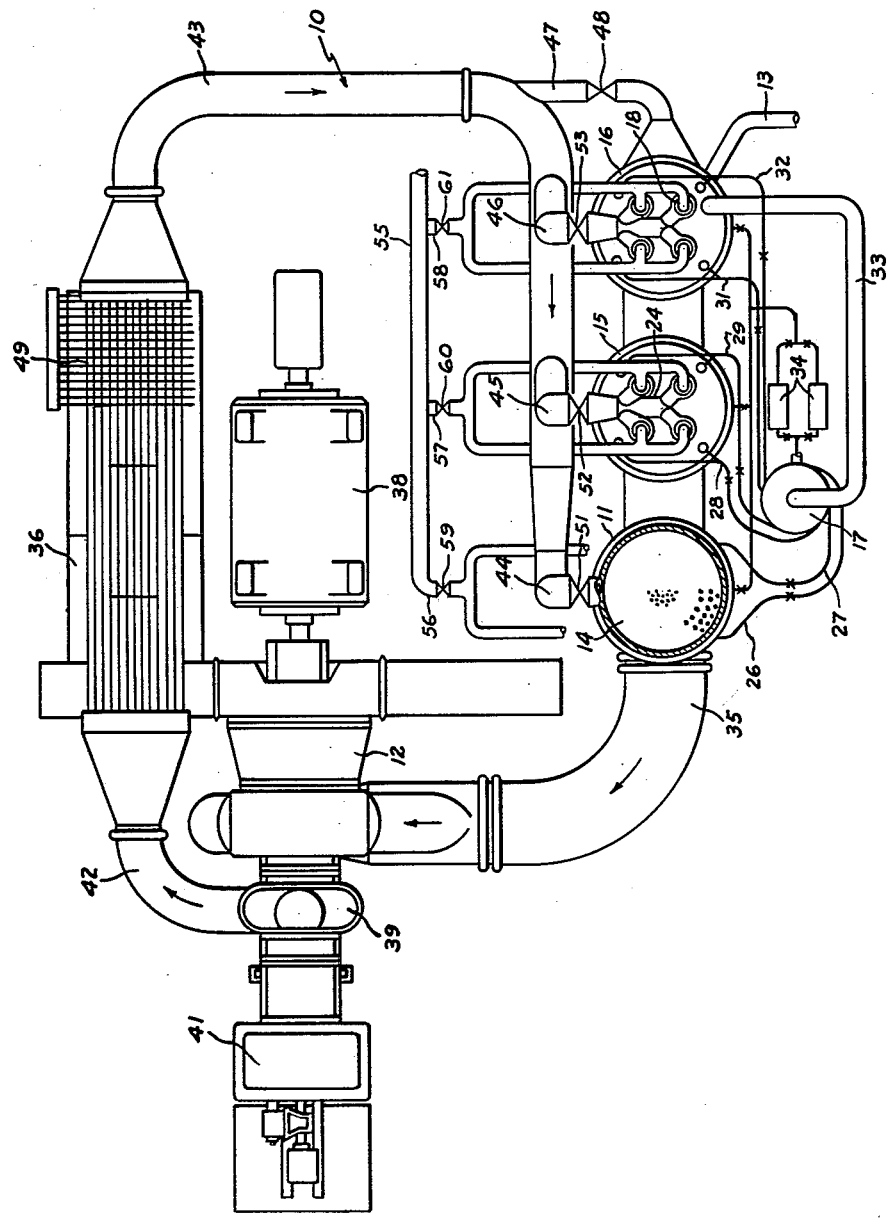

INVENTORS
GEORGE PARMAKIAN
BY GUNTER R. TERPE
Norman S. Blodgett

INVENTORS
George Parmakian
Gunther Terpe
BY
Attorney

United States Patent Office 3,110,290
Patented Nov. 12, 1963

3,110,290
POWER GENERATING SYSTEM
George Parmakian, Worcester, Mass., and Gunter R. Terpe, San Francisco, Calif., assignors to Riley Stoker Corporation, Worcester, Mass., a corporation of Massachusetts
Filed June 21, 1960, Ser. No. 37,802
3 Claims. (Cl. 122—479)

This invention relates to a power generating system and more particularly to apparatus for converting thermal energy to electrical energy. This is a continuation-in-part of our patent application Serial Number 560,676 filed January 23, 1956 now abandoned.

It has been proposed that a steam generator be used to generate electricity by passing the steam through a steam turbine and by passing exit combustion gases through a gas turbine and that both the steam and the gas turbines be used for generating electricity, with a portion of the power derived from the gas turbine being used to compress the air entering the steam generating unit for combustion. In the well-known Velox steam generating system, for instance, the combustion air is compressed or supercharged before it enters the combustion chamber. Under such conditions and without too great a loss in overall efficiency, a larger pressure drop than in a conventional steam generating unit can be tolerated and high gas velocities can be applied, resulting in high heat transfer values. The combustion gases leaving the steam generating unit are still at a high pressure and are passed through a small gas turbine which drives a compressor for supercharging the furnace. For the purpose of maintaining a high combustion cycle efficiency over a wide load range, it is desirable to operate the steam turbine at a fixed pressure and temperature, while the temperature of the combustion gases passing to the gas turbine are held constant. These requirements are not met by systems presently known because of the difficulty in controlling all these values simultaneously and in a simple manner. The deficiencies of the prior art have been obviated in a novel manner by the present invention.

It is, therefore, an outstanding object of the present invention to provide a power generating system in which both a steam turbine and a gas turbine are operated efficiently from the products of a steam generating unit.

Another object of the invention is the provision of a steam generating unit in which the steam and the exit gases are maintained at fixed, predetermined pressures and temperatures.

It is a still further object of the instant invention to provide a power generating system in which a steam generating system is regulated to produce steam at constant pressure and temperature for use in a steam turbine and gas at nearly constant pressure and temperature for use in a gas turbine irrespective of the electrical load on the system.

Another object of the present invention is the provision of a steam generating unit for use with steam and gas turbines in which both the generated steam and the exit gases are closely regulated as to pressure and temperature irrespective of load.

With these and other objects in view as will be apparent to those skilled in the art, the invention resides in the combination of parts set forth in the specification and covered by the claims appended hereto.

Figure 2:
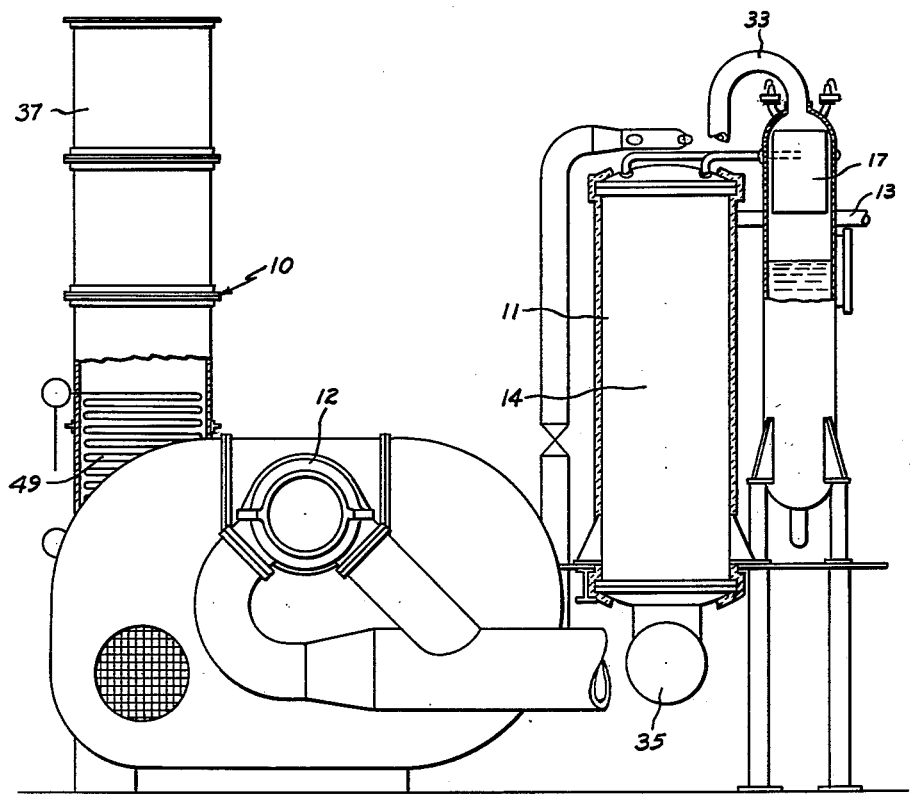
Figure 3:
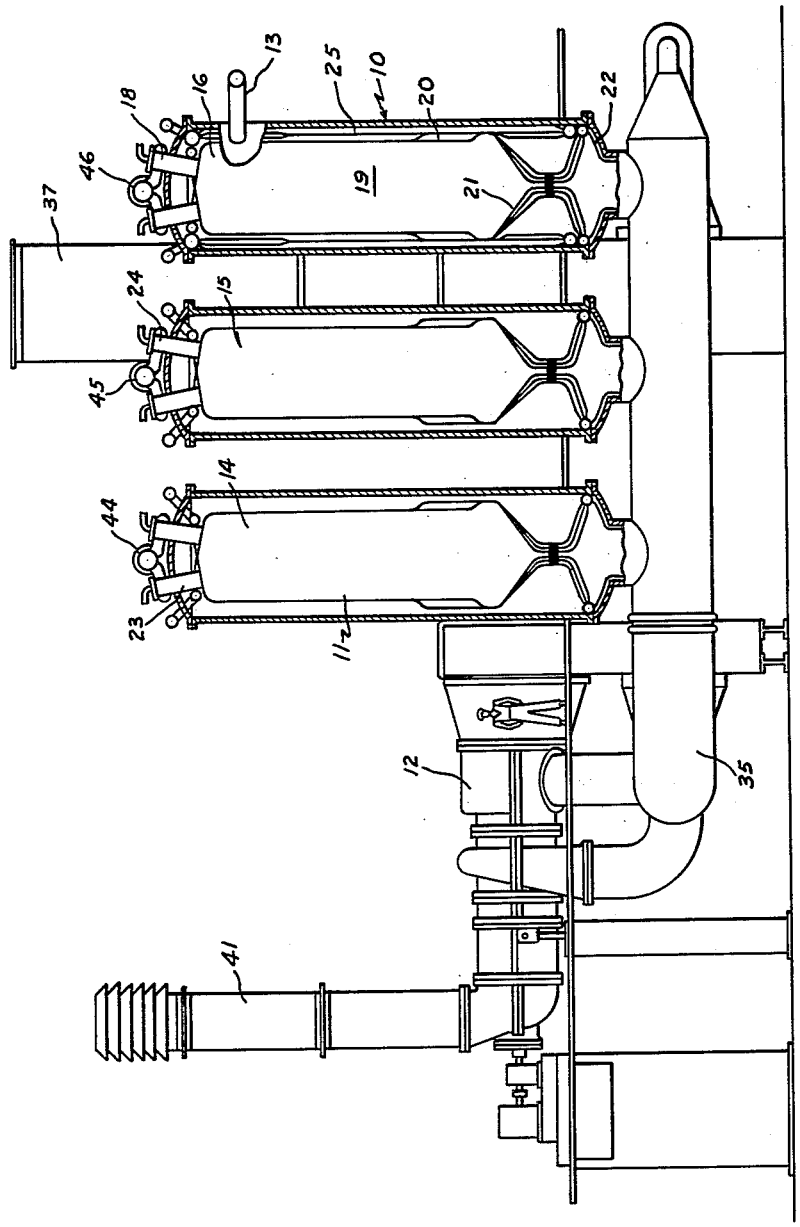
Figure 4:
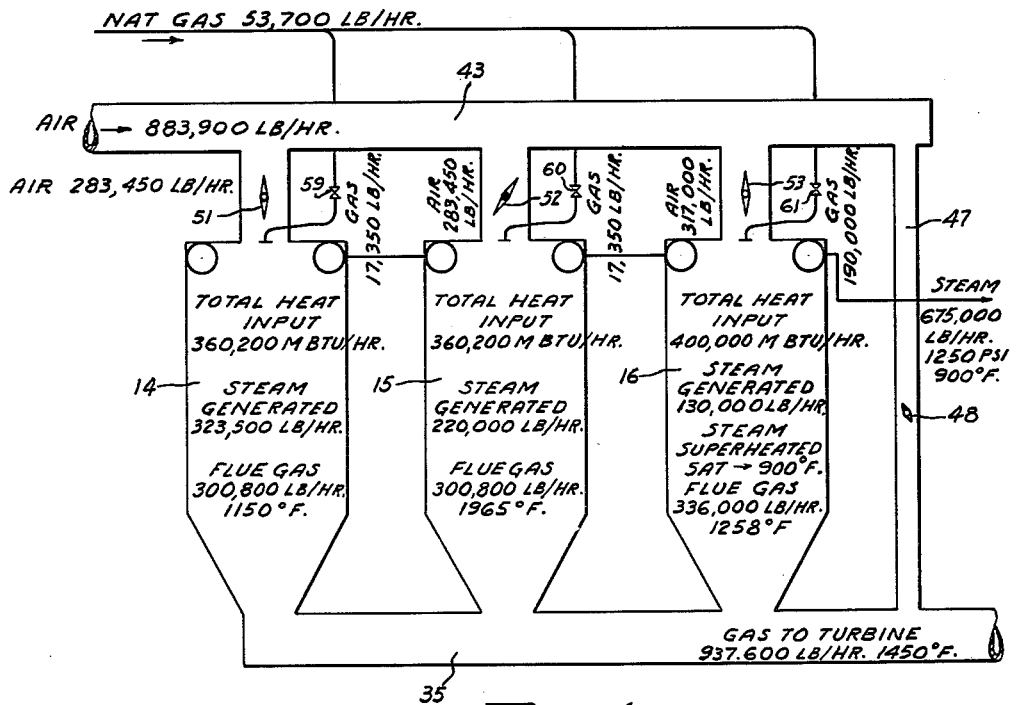
Figure 5:
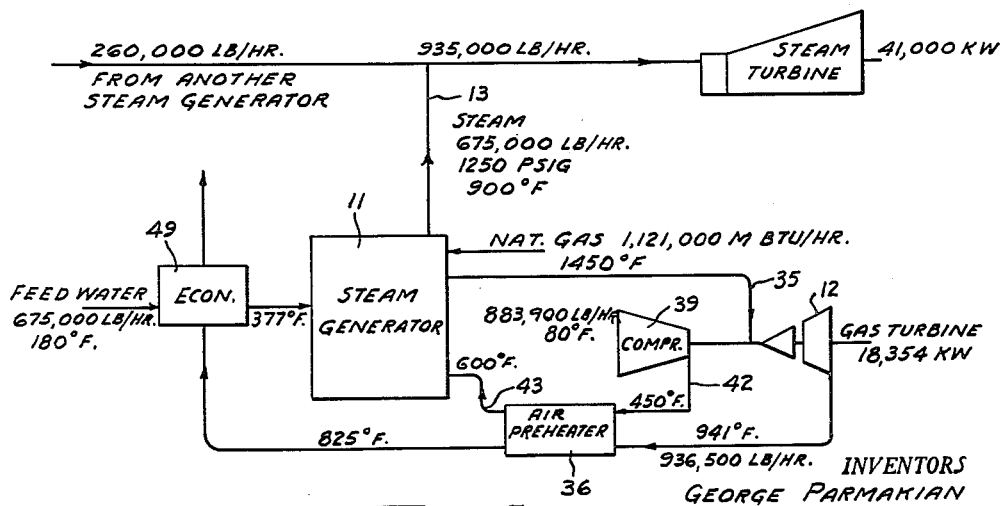
Figure 6:
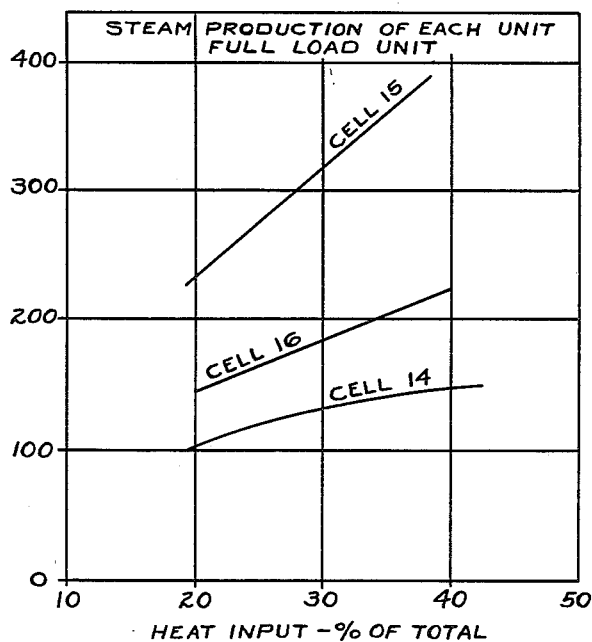
Figure 7:
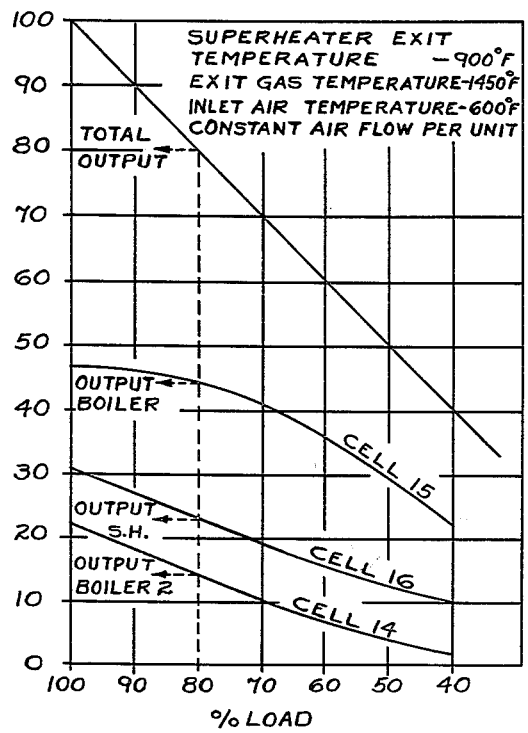

The character of the invention, however, may be best understood by reference to certain of its structural forms as illustrated by the accompanying drawings in which:

FIGURE 1 is a plan view of a power generating unit embodying the principles of the present invention, FIGURE 2 is an end elevational view of the apparatus shown in FIGURE 1, FIGURE 3 is a side elevational view of the apparatus with a portion broken away for clarity of presentation, FIGURE 4 is a schematic heat balance diagram of a power generating system constructed according to the invention, FIGURE 5 is a schematic diagram showing the layout of the power generating system, and FIGURES 6 and 7 are graphs of performance of the unit.

Referring first to FIGURE 1, wherein is best shown the general principles of the invention, the power generating system, indicated generally by the reference numeral 10, is shown as comprising a steam generating unit 11 used in conjunction with a gas turbine 12 and a steam header 13 leading to a steam turbine, not shown. The steam generating unit 11 consists generally of a first heat exchanger cell 14, a second heat exchanger cell 15, and a third heat exchanger cell 16 in conjunction with a steam and water separator 17. Each of the heat exchanger cells consists of a vertical tower having a pressurized casing, the inside of which is lined with boiler tubes. At the upper end of each is installed a fuel burner. Cell 16, which is typical of the cells, has a burner 18 located at its upper end. Boiler tubes 20 extend down the sides defining a combustion chamber 19 and extend toward each other at the bottom end to afford a closure 21. The exit end of the cell is cooled by tubes 22. The cells 14 and 15 are constructed in a similar way and are provided respectively with burners 23 and 24. In the case of cell 16, additional superheater tubes 25 extend along the walls of the cell behind the regular boiler tubes and are shielded from the direct radiation of the combustion chamber 19. Extending from the cell 14 are conduits 26 and 27 leading to the steam and water separator 17. Similar conduits 28 and 29 lead from the boiler tube units of the cell 15 to the separator 17 and conduits 31 and 32 perform a similar function in connection with the cell 16. Check valves are provided in each of these conduits to prevent back-flow under certain conditions. The steam and water separator 17 is of a conventional type making use of centrifugal force to remove steam from a mixture of steam and water. The steam is released at the upper end into a conduit 33 leading to the superheater tubes 25 in the cell 16. At the lower end the water is passed into circulator pumps 34 and from there is distributed to the generating tubes in the cells 14, 15, and 16. At their lower ends the cells 14, 15, and 16 are connected to a horizontal duct 35 leading to the turbine 12. The output of the turbine 12 is connected to an air heater 36, the gas side of which discharges into a stack 37. One end of the turbine 12 is connected to an electric generator 38 of the conventional type, while the other end is connected to an air compressor 39. The compressor 39 is connected on its input side to an air intake 41 containing, in the usual way, a silencer and filter. The output side of the compressor 39 is connected by a conduit 42 to the intake air side of the air heater 36. The discharge side of the air heater 36 is connected by a conduit 43 to conduits 44, 45, and 46 leading to the burners 23, 24, and 18 respectively of the cells 14, 15, and 16. A by-pass conduit 47 having a damper valve 48 connects the conduit 43 directly to the duct 35. An economizer 49 is situated at the bottom of the stack 37, as is best evidenced in FIGURE 2. Individual valves 51, 52, and 53 are situated in the combustion air conduits 44, 45, and 46, respectively, leading to the cells 14, 15, and 16. Fuel enters the system through a conduit 55 which has branches 56, 57, and 58 leading to the burners 23, 24, and 18, respectively. The branches 56, 57, and 58 are provided with regulating valves 59, 60, and 61, respectively.

The operation of the invention will now be readily understood in view of the above description. Water enters the system through the economizer 13 and then passes to the boiler tubes in the cells 14, 15, and 16. After passing through the tubes, the mixture of water and steam enters the separator 17 where the steam is separated from the water. The water leaves the lower end, passes through the circulator pumps 34, and is returned to the cells. The steam is released from the top of the separator and passes through the conduit 34 to the superheater tubes 25 in the cell 16 where it is subjected to further heating. The superheated steam leaves the cell 16 through the conduit 13 and passes through the steam turbine in the usual manner. Steam causes the steam turbine to rotate and to generate electrical power. Then, the steam flows to a condenser and from the condenser passes as water to a sump tank in the usual manner. Fuel and air are mixed in the burners at the top of the cells and burn inside of the cells. The gas passes over the boiler tubes and then downwardly into the conduit 35. The gas is passed at a high rate of speed into the gas turbine 12 which rotates and produces electrical power by means of the generator 38. The gas then passes around the tubes in an air heater 36, upwardly around the tubes in the economizer 37, and then out through the economizer 49. Air enters the compressors 39 through the unit 41, and, after being compressed, passes into the conduit 42 and through the tubes in the air heater 36. After leaving the air heater, the compressed air passes through the conduit 43 and is distributed into the conduits 44, 45, and 46 leading to the burners 23, 24, and 18.

The principal problem presented by the apparatus of the type described is that of maintaining the quantity, temperature, and pressure of the steam passing into the steam turbine at a predetermined value and at the same time maintaining the products of combustion passing through the gas turbine 12 at a predetermined pressure and temperature. In a conventional steam generating unit, for instance, it is possible to maintain the steam temperature and pressure at a predetermined quantity irrespective of the load on the unit; that is to say, irrespective of the amount of steam required by the steam turbine. In regulating the pressure and temperature of the steam in this manner, however, the conventional steam generating unit thus produces products of combustion at varying temperatures and in varying quantities. The performance characteristics of such a unit would be undesirable in use with a gas turbine. An examination of the apparatus described above shows that the inventor has provided three heat exchange cells 14, 15, and 16 of which cells 14 and 15 have tubes for generating saturated steam, but also has separate tubes shielded from radiation for superheating the steam. Furthermore, the cells have different performance characteristics. Depending upon the desired performance characteristics, the cells 14 and 15 may have fairly different amounts of boiler heating surface or, in an extreme case, cell 15 may have considerable boiler heating surface while the cell 14 consists of a brick-lined combustion chamber with no boiler heating surface. With any physical layout described above, the greatest flexibility of the system is obtainable by providing three adjusting features: by adjusting the firing rate of the burners by controlling the flow of fuel through the fuel valves, by a supplementary control of the air flowing to the burners by control of the air dampers, and by by-passing the air through the conduit 47. By adjusting the firing rate in the burners 23, 24 and 18 connected with the cells, it is possible to adjust the load, that is to say, the amount of saturated steam generated, and also it is possible to regulate the temperature and pressure of the superheated steam which passes into the conduit 13 on its way to the steam turbine. Generally speaking, this will be done by adjusting the firing rate of the cell 16 by adjusting the fuel valve 61 passing to the burner 18 to regulate superheated steam temperature. At the same time the rate of firing in the other two cells would be adjusted by means of the valves 59 and 60 to determine the proper amount of steam. At low loads, for instance, it might be expedient to entirely stop firing in cell 14 and operate only with cell 15 and cell 16. In this case, the check valves in the tubes 26 and 27 will prevent the carryover of steam and water into the tubes of cell 14 when it is not developing pressure itself. For every load there will be an adjustment of the valves and firing rates of the cells 14, 15, and 16 which will maintain the desired constant steam pressure and temperature at that load. This part of the problem is readily solved, therefore. Regarding the gas temperatures passing to the gas turbine 12, it can be seen also, if we regard this as a separate problem, that the gas temperature in the conduit 35 is dependent, not only in quantity but also in temperature, on the rate of firing taking place in the cells 14, 15, and 16. By properly adjusting the firing rates, the amount of gas and the temperature of the gas flowing into the conduit 35 can be regulated, the pressure, of course, being determined by the compressor 39. Thus, looking at the problem as strictly one of gas temperature and pressure regulation, the adjustment of the burners in this way solves that problem. However, the present invention combines the features of both of these methods of regulating and it will be understood that since, there are almost an infinite number of firing rate adjustments which will give the desired steam characteristics at a given load and an infinite number of firing rates which will give the desired gas characteristics at a given load, there must be a firing rate combination for the three cells which will maintain the steam and gas characteristics at a predetermined value for each given load on the system.

The manner in which the invention is operated may be better understood by reference to a specific example. FIGURES 4 and 5 show more or less schematically the heat balance and schematic relationships in a practical steam generating unit embodying the principles of the present invention. In the heat balance diagram, it can be seen that natural gas enters the system at the rate of 53,700 lbs. per hour, while air from the compressor enters at the rate of 883,900 lbs. per hour. In the specific illustration shown, it is desired to obtain superheated steam at the rate of 675,000 lbs. per hour at a pressure of 1250 p.s.i. and a temperature of 900 degrees F. At the same time the flow of gas to the turbine must be maintained at a rate of 937,600 lbs. per hour at a temperature of 1450 degrees F. In order to obtain this, the valves which adjust the firing rate in the three cells 14, 15, and 16 are regulated in the following manner. Regarding the cell 14, air is admitted at the rate of 283,450 lbs. per hour and gas at the rate of 17,350 lbs. per hour to give a total heat input of 360,200 million B.t.u. per hour which will bring about the generation of 323,500 lbs. per hour of saturated steam. This results in flue gas passing to the conduits from this particular cell 14 at the rate of 300,800 lbs. per hour at a temperature of 1150 degrees F. Now, in cell No. 2, air is admitted at the rate of 282,450 lbs. per hour and gas at the rate of 17,350 lbs. per hour to give a total heat input of 360,200 million B.t.u.'s per hour. However, cell 15 is designed with considerably less heat exchange surface or boiler tube length than is the cell 14. This means that, with a given firing rate, which in this example is the same as the firing rate of cell 14, cell 15 will only generate 220,000 lbs. per hour of steam. Thus the flue gas, although it will be the same in amount, that is to say, 300,800 lbs. per hour, will be at a higher temperature, this temperature being 1,965 degrees F. In the case of cell No. 16, which, it will be recalled, contains the superheating tubes 25, air is admitted at the rate of 317,000 lbs. per hour and gas at the rate of 19,000 lbs.

per hour to give a total heat input of 400,000 million B.t.u. per hour. The heat exchange elements, or boiler tubes, in this cell are selected in such quantity and surface area as to give steam generated at the rate of 130,000 lbs. per hour, while the steam is superheated from saturation up to 900 degrees F. The steam to be superheated will, of course, be equal to the sum of the rates of steam generation in all three cells, i.e., at the rate of 675,000 lbs. per hour. With this arrangement products of combustion will leave the cell 16 at the rate of 336,000 lbs. per hour at a temperature of 1258 degrees F. It can be seen, then, that all of the flue gas flowing into the conduit 35 from the cells will bring the total amount up to 937,600 lbs. per hour; the mixture at the rates and the temperatures indicated will give a resulting temperature of gas flowing to the turbine of 1450 degrees F. The figures given are for a 100% load of the unit under consideration. At a lower load the amount of air and gas going to each cell would be regulated in the manner described above to give a lower amount of steam quantity, but at the same time permitting the temperature to remain the same. In the same way the gas going to the turbine would be lower in amount, but the temperature would be the same.

The flow diagram shown in FIGURE 5 is more or less self-explanatory. Feed water enters the economizer 49 at the rate of 675,000 lbs. per hour and 180 degrees F. at full load. It leaves the economizer and proceeds to the steam generator with a temperature of 377 degrees F. The steam leaves the steam generator at the rate of 675,000 lbs. per hour at 1250 p.s.i. gauge and 900 degrees F. It joins with 260,000 lbs. per hour of steam coming from an existing plant to make up 935,000 lbs. per hour of steam passing to the steam turbine. At the same time, natural gas is entering the system through the burners to give a heat input of 1,121,000 B.t.u.'s per hour and combustion gases leave the steam generator at 1450 degrees F. to pass through the gas turbine. The gas leaves the gas turbine at 741 degrees F. and passes through the air preheater in heat exchange relationship to the incoming air, leaves the air preheater at 825 degrees F., passes through the economizer in heat exchange relationship to the incoming feed water, and leaves the economizer at 300 degrees F. Air enters the compressor at the rate of 883,900 lbs. per hour at 80 degrees F. and leaves the compressor at a temperature of 450 degrees. After passing through the air preheater the air, before it enters the steam generating unit, is at 600 degrees F. By the practice of the present invention, the gas entering the gas turbine from the steam generator can be maintained at 900 degrees F. and 1250 p.s.i. irrespective of changes in load on the unit.

The general concept of the invention can best be understood by reference to FIGURES 6 and 7. The steam turbine-gas turbine cycle presents us with several requirements:

Steam pressure and temperature, steam flow, and gas exit temperature must be maintained constant over a turbine load of 40% to 100% of full load.

a. Turbine compressor speed will be constant in this range. Therefore, the total air for combustion will remain constant in spite of a reduced fuel flow as the load drops. This introduces a severe change in heat transfer conditions in the boiler.

b. The unit must be controllable with three controlled functions instead of the two functions usually handled in a conventional boiler. Only one combination of differential firing of the three cells can satisfy, at any load, the required steam temperature and pressure, steam quantity, and turbine inlet gas temperature. More than one possibility will make the control useless.

c. The control in its simple elements consists of the following functions.

(1) Steam pressure can and should be controlled by raising and lowering the amount of fuel supplied to all three cells by parallel adjustment.

(2) Steam temperature can be controlled by making vernier adjustments in the fuel supply to the superheater cell.

(3) Exit gas temperature can be controlled by making similar adjustments in the fuel supply to the smaller boiler cell.

d. The design of the cells from the point of view of steam generation versus fuel input must have good regulation characteristics. FIGURE 6 represents typically the calculated steam production versus heat input at the full load point. These curves must have angularity; if the curves are too flat, the fuel regulation to all three cells by parallel adjustment to maintain steam pressure becomes unstable. Extensive calculations show that the acceptable cell regulation characteristic are obtained with two boiler cells with different heating surfaces. As a matter of fact, when the smaller boiler unit approaches zero heating surface, optimum conditions occur.

e. The stability of control and the desirable cell regulation characteristics must prevail also at loads below full load. In some respects the problems of control could become more acute because of the matter of varying high excess air because of its pronounced effect on steam temperature, steam pressure and turbine inlet gas temperature. Calculations have been carried in steps from full load to 40% to ascertain the possibilities of points of inflections of cell performance. The concept of the three cell design demonstrated great stability in the objectives sought; FIGURE 7 shows the steam distribution plotted versus turbine load for a specific unit.

f. The regulation cell characteristics permit two additional objectives.

(1) The ability to shift steam generation from one cell to another as a consequence of surface fouling.

(2) The ability to compensate for errors in design judgment of heating surfaces without having to resort to very expensive corrective measures.

The concept presented here is entirely different from that found in conventional boilers. The invention is not just able to vary furnace exit temperature, say, by firing differentially in twin furnaces. The objective is to hold the furnace exit temperature to a definite value throughout the wide load range. In many repects this is similar to a conventional boiler in which steam pressure and steam temperature are controlled but with the added burden of controlling the boiler exit gas temperature constant over a wide boiler range. The present invention handles this difficult design and control problem by utilizing this multiple cell arrangement of two boiler cells of varying heating surfaces.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A steam and gas generating unit in which products of combustion and steam qualities may be maintained at pre-selected values, comprising three pressurized heat exchanger cells with burners mounted therein, means supplying fuel and air under pressure to the cells, two of the cells containing steam generating tubes only and having widely different amounts of heat exchange surface as compared with each other, the third cell having superheater elements mounted therein, a common conduit into which the elements of combustion are directly discharged, and means for independently regulating the rate of firing of the burners into the individual cells to maintain a temperature of the products of combustion passing to the conduit and the temperature of steam generated at predetermined constant values irrespective of load changes.

2. A steam and gas generating unit in which products of combustion and steam qualities may be maintained at pre-selected values, comprising three vertically elongated pressurized heat exchanger cells with burners mounted at the upper ends, means supplying fuel and air under pressure to the cells, two of the cells containing steam generating tubes only and having widely different amounts of heat exchange surface as compared with each other, the third cell having superheater elements mounted therein, a common conduit to which the lower end of the cells are connected and into which the products of combustion are directly discharged, and means for independently regulating the rate of firing of the burners in the individual cells to maintain the temperature of the products of combustion in the conduit and the temperature of steam generated at pre-determined constant values irrespective of load changes.

3. A steam and gas generating unit in which products of combustion and steam qualities may be maintained at pre-selected values, comprising three vertically elongated pressurized heat exchanger cells with burners mounted at the upper ends and with boiler tubes lining the walls, means for supplying fuel and air under pressure to the cells, two of the cells containing steam generating tubes only and having widely different amounts of boiler tube surface as compared with each other, the third cell having its walls lined with superheater tubes, a common horizontal conduit to which the lower ends of the cells are connected and into which the products of combustion are directly discharged, and means for independently regulating the rate of firing of the burners in the individual cells to maintain the temperature of the products of combustion in the conduit and the temperature of steam generated in the unit at pre-determined constant values irrespective of load changes.

References Cited in the file of this patent
UNITED STATES PATENTS

| | | |
|---|---|---|
| 2,285,442 | Kerr | June 9, 1942 |
| 2,818,837 | Frisch | Jan. 7, 1958 |
| 2,920,609 | Iager et al. | Jan. 12, 1960 |